July 15, 1952  F. W. LAWRENCE  2,603,249
POWER SAW ASSEMBLY FOR TRACTORS
Filed Nov. 13, 1947  2 SHEETS—SHEET 1

Inventor

Forby W. Lawrence

By *Clarence A. O'Brien
and Harvey B. Jacobson*
Attorneys

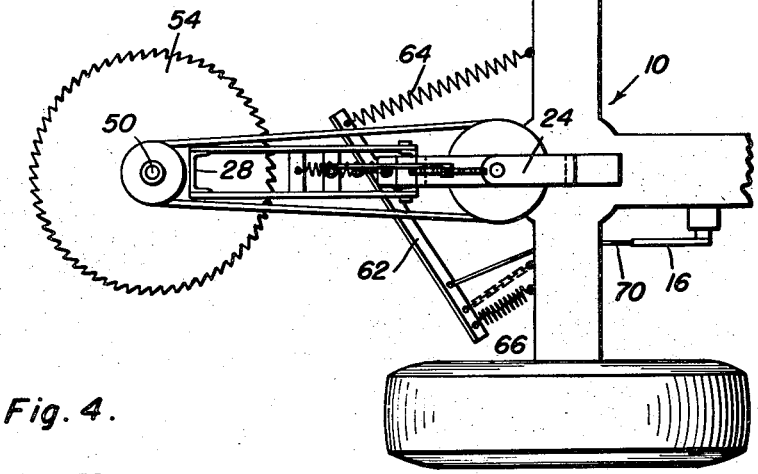
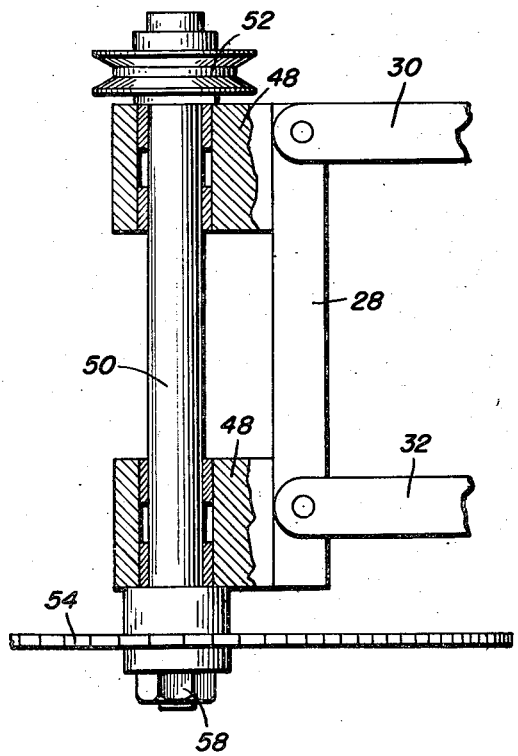
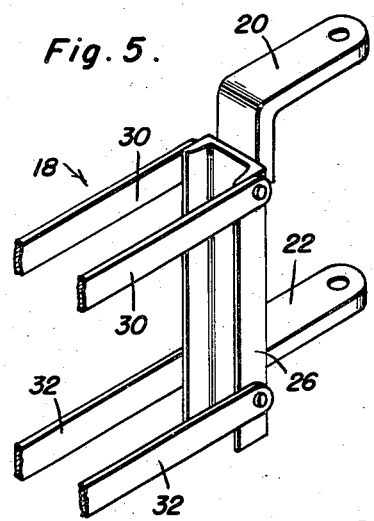

Patented July 15, 1952

2,603,249

UNITED STATES PATENT OFFICE 2,603,249

POWER SAW ASSEMBLY FOR TRACTORS

Forby W. Lawrence, Selma, Ala.

Application November 13, 1947, Serial No. 785,676

6 Claims. (Cl. 143—43)

This invention comprises novel and useful improvements in a power saw assembly for tractors and more specifically pertains to a power operated saw rig which may be readily applied to tractors or similar devices for operation from the power take-off thereof.

The primary object of this invention is to provide a power operated saw which may be readily adjusted to accommodate itself for cutting trees at various heights; and to provide a saw mechanism which is readily adjustable in a horizontal plane for cutting trees or the like.

The invention is particularly characterized by features of construction whereby the entire saw assembly is mounted for rotation about a vertical axis; wherein improved means are provided for rotating said saw assembly about said vertical axis; wherein there is provided additional means for selectively raising or lowering said saw; together with improved means for effecting the raising or lowering motion of the saw; together with improved means for adjustably positioning said saw vertically of its supporting rig.

A further feature of the invention consists in rotating a saw from the power take-off of a tractor or the like, together with means for rotating the entire saw rig about the vertical axis of the power take-off, whereby said rotation and such adjustment may be effected without interfering with the driving connection of the saw.

And a further and final important feature of the invention to be specifically enumerated herein, resides in the provision of a power operated saw assembly which shall be of simple and light weight construction, economical in cost and dependable in operation.

These, together with various ancillary objects and features of the invention which will later become apparent as the following description proceeds, are attained by this device, a preferred embodiment of which has been illustrated, by way of example only in the accompanying drawings, wherein:

Figure 3 is a top plan view of the device shown in Figures 1 and 2;

Figure 4 is a detail view taken on an enlarged scale in vertical transverse section through the journals of the saw, certain parts being shown in elevation; and, Figure 5 is a fragmentary perspective view showing a portion of the saw supporting frame.

Figure 1:
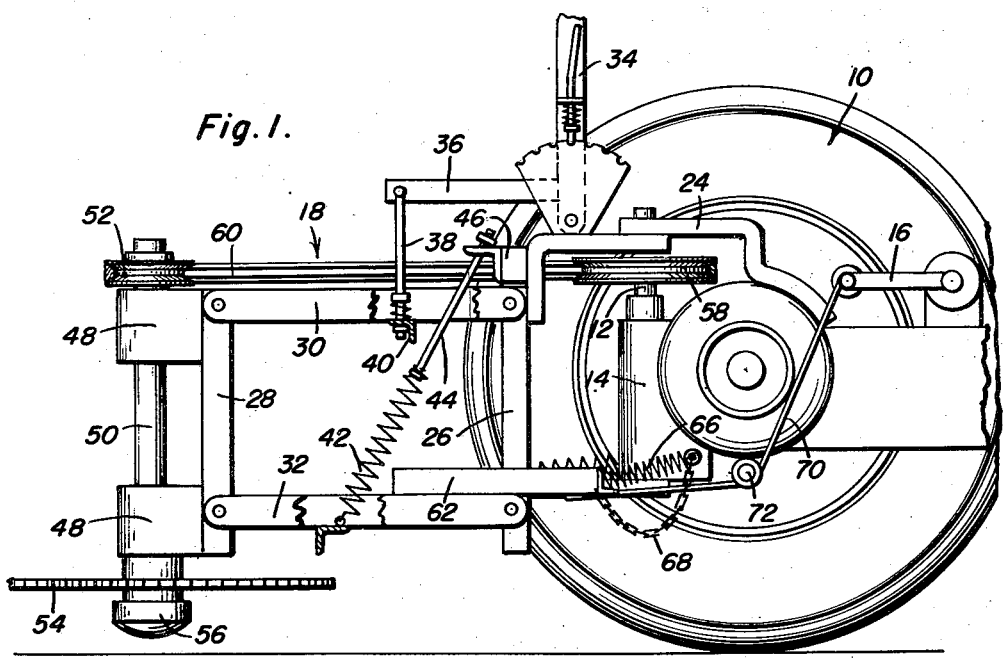
Figure 1 is a side elevational view showing the improved saw assembly mounted upon the rear end of a tractor for operation by the power take-off thereof.

Referring now more specifically to the accompanying drawings, wherein like numerals designate similar parts throughout the various views, it will be seen that 10 denotes generally the rear portion of a part of a tractor which may be of any conventional design, and to which has been applied a vertically disposed power take-off shaft 12 extending into a gear casing 14 with which the tractor is customarily provided. A power operated arm 16 is illustrated, with which the tractor is customarily equipped and ordinarily is employed to raise or lower various implements attached to and powered by the tractor.

A saw supporting frame indicated generally at 18, a portion of which is shown particularly in Figure 5, is provided with upper and lower supporting brackets 20 and 22 respectively which are suitably journaled for rotation about the axis of the power take-off shaft 12, being pivotally connected to an upper bracket 24 suitably mounted upon a portion of the frame of the tractor while the lower bracket 22 is attached in any convenient manner to the bottom of the gear casing 14 in axial alignment with the power take-off shaft 12. As will thus be seen, the supporting frame is freely rotatable in a horizontal plane about the vertical axis of the power take-off shaft 12.

Figure 2:
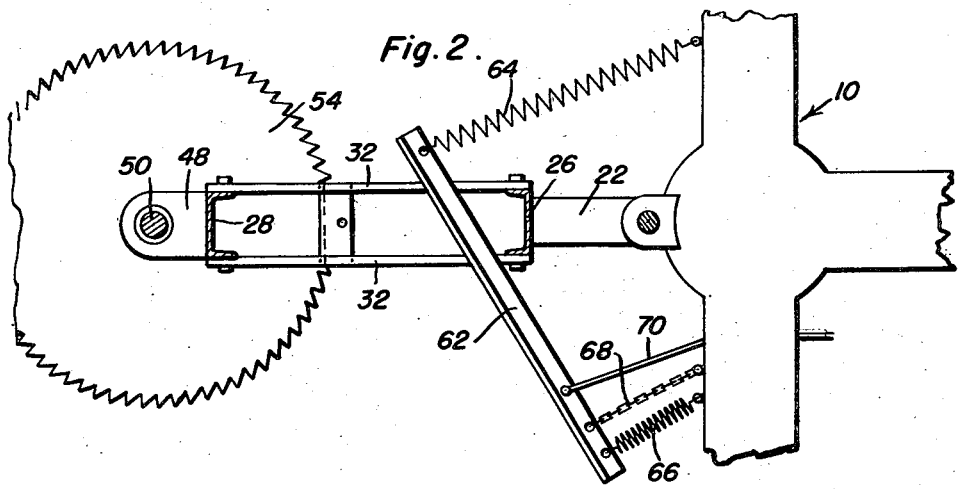
Figure 2 is a horizontal sectional view through the device of Figure 1.

Suitably attached to the supporting brackets 20 and 22, is a vertically disposed member 26 which is connected to a similarly disposed member 28 by a parallel bar linkage consisting of upper and lower pairs of links 30 and 32 respectively. These links are pivoted upon the outside and at the upper and lower extremities of the vertical bars 26 and 28, which latter are preferably U-shaped, channel construction as shown in Figures 2 and 5. It will thus be seen that the bars 30 and 32 are likewise bars 28 and 26 are pivotally connected for parallel movement with respect to each other by a means to be later described.

Suitably pivotally mounted upon the upper bracket 20, is a handle lever 34 having a crank arm 36 which is connected by a link 38, to a transverse bar 40, rigidly attached to the lower edges of the upper link 30, whereby the latter may be raised or lowered by proper manipulation of the handle lever 34.

A spring 42 is fastened at its lower extremity to the lower link 32, and at its upper end is secured to an adjusting rod 44 which extends through a support bracket 46 suitably formed upon or attached to the upper bracket 20, by means of which an adjustable spring tension may be applied to the lower link 32, for counterbalancing the weight of the parallel linkage, saw frame and saw carried thereby, to thus render easier the operation of the adjusting lever 34 for elevating or lowering the saw and supporting frame.

At its outer surface, as shown in Figure 4, the rear frame bar 28 is provided with rearwardly extending journals 48 within which is rotatably mounted the vertically disposed saw shaft 50 which is provided with a driving pulley 52 at its upper end, and has the disk saw 54 detachably secured to its lower extremity. Preferably, as shown in Figure 1, a shield or cover 56 is secured by and surrounds the saw securing nut 58 at the lower end of the shaft 50, to provide a stop means for limiting downward movement of the saw relative to the earth, and preventing danger of the saw digging into the ground.

As shown best in Figure 1, a driving pulley 58 is secured to the power take-off shaft 12 below the supporting brackets 20 and 24, and this pulley is connected with the driven pulley 52 by means of a belt 60 although any other suitable driving connection may be employed as desired. It should be here noted that since the entire saw frame is operable about the vertical axis of the power take-off shaft 12, there is no interference with the driving engagement of the saw with its source of power during horizontal operating movement of the saw and its supporting frame.

As shown best in Figures 1 and 2, the lower link 32 has securely attached to the upper surfaces thereof and extending transversely thereof from each side, a transverse bar 62, to one extremity of which is secured any suitable resilient means such as a spring 64, whose other extremity is attached to any convenient part of the frame of the tractor, for urging the supporting frame yieldingly about its vertical axis of rotation. At its other extremity, the transverse bar 62 is provided with a similar spring 66 similarly attached to the frame of the tractor, and tending to maintain the saw frame and saw in their rest or inoperative position. A stop means consisting preferably of a chain 68 is suitably attached to the transverse bar 62 into the frame of the tractor, for limiting the movement imparted to the supporting frame by the spring 64, to thereby prevent the saw contacting one of the wheels of the tractor or other obstruction thereof. A control cable 70 has one end secured to the transverse bar 62, is entrained over an idler pulley or guide 72 suitably carried by the tractor, and has its fold extremity attached to the end of the power operated lever 16.

The operation of the device is as follows:

When in its idle position, the saw supporting frame is disposed in a clockwise direction that is indicated in Figures 2 and 3, with the transverse bar 62 being positioned substantially parallel to the rear axle of the tractor, and with the springs 64 and 66 under substantially equal tensions. The tractor is now maneuvered until the saw, in its idle position, is positioned against or adjacent to the surface of a tree or similar object to be sawed. The saw is then rotated by operating the power take-off shaft 12, in the customary manner, and the control cable 70 is manipulated by means of the power operated lever 16, thereby gradually drawing the saw frame and saw into the position indicated in Figures 2 and 3 against the opposition of the spring 64. As the saw thus moves in a horizontal plane about its vertical pivot coaxial with the shaft 12, the blade is gradually brought into contact with and is fed through the tree or other object to be cut.

It should be here noted that by means of the parallel bar linkage, the levers 34 may be operated to raise or lower the links 30 and 32 about their pivot points on the vertical bar 26, thus raising the other vertical bar 28 but maintaining the same parallel to the bar 26 and in a vertical plane throughout this adjustment.

It will thus be seen that there has been provided effective means for maintaining a saw in a position for rotation about a vertical axis, for oscillating the saw in a horizontal plane about a parallel vertical axis, together with further means for raising or lowering the saw while maintaining the saw axis of rotation in a vertical plane.

From the foregoing it is thought that the manner of operating the invention and the advantages arising therefrom will be readily understood, and accordingly further explanation is believed to be unnecessary. However, since numerous modifications will readily occur to those skilled in the art, after a study of the foregoing specification and attached drawings, it is not intended to limit the invention to the exact construction shown and described, but all suitable modifications and equivalents may be resorted to falling within the scope of the appended claims.

Having described the invention, what is claimed as new is:

1. A power saw assembly for attachment to a prime mover comprising a vertically disposed housing, a driven shaft having a saw attached thereto rotatably journaled in said housing, a support frame pivotally attached to the prime mover for horizontal movement about a vertical axis, vertically spaced connecting members terminally pivoted to said housing and said support frame for movement relative thereto in a vertical plane, actuating means vertically swinging said connecting members about said support frame to vertically move said housing, vertical pivotal movement of said connecting members causing parallel motion of said housing towards and away from said support frame, and a drive shaft disposed coaxially of the vertical pivotal axis of said support frame and operatively connected to said driven shaft.

2. A power saw assembly comprising a vertically disposed housing, a driven shaft having a saw attached thereto rotatably journaled in said housing, a vertically disposed support frame pivotally attached to a prime mover for horizontal swinging, vertically spaced connecting members terminally pivoted to said housing and to said support frame for movement in a vertical plane, an actuator arm pivotally attached to said support frame for swinging movement in a vertical plane, means operatively connecting said arm to one of said connecting members to vertically swing the latter about said frame as said arm is swung, vertical swinging movement of said connecting members simultaneously causing vertical movement of said housing and parallel motion of said housing towards and away from said support frame.

3. A power saw assembly comprising a vertically disposed housing, a driven shaft having a saw attached thereto rotatably journaled in said housing, a vertically disposed support frame pivotally attached to a prime mover for horizontal swinging, vertically spaced connecting members terminally pivoted to said housing and to said support frame for movement in a vertical plane, an actuator arm pivotally attached to said support frame for swinging movement in a vertical plane, means operatively connecting said arm to one of said connecting members to vertically swing the latter about said frame as said arm is swung, vertical swinging movement of said connecting members simultaneously causing vertical movement of said housing and parallel motion of said housing towards and away from said support frame, spring means attached to one of said connecting members and to said support frame for counterbalancing the weight of the vertically movable portion of said saw assembly.

4. In combination with a prime mover having a vertically disposed power take-off drive shaft, a power saw assembly comprising a vertically disposed housing, a driven shaft having a saw attached thereto disposed in said housing, a U-shaped support frame having the legs thereof mounted on the prime mover for horizontal swinging movement about the axis of rotation of said drive shaft, vertically spaced connecting members terminally pivoted to said housing and to the web portion of said U-shaped support frame for vertical swinging movement, means drivingly connecting said drive and driven shafts, actuating means carried by said support frame and operatively attached to one of said connecting members for vertically swinging said members and elevating said housing, and means for horizontally swinging said housing and support frame.

5. In combination with a prime mover having a vertically disposed power take-off drive shaft, a power saw assembly comprising a vertically disposed housing, a driven shaft having a saw attached thereto disposed in said housing, a U-shaped support frame having the legs thereof mounted on the prime mover for horizontal swinging movement about the axis of rotation of said drive shaft, vertically spaced connecting members terminally pivoted to said housing and to the web portion of said U-shaped support frame for vertical swinging movement, means drivingly connecting said drive and driven shafts, actuating means carried by said support frame and operatively attached to one of said connecting members for vertically swinging said members and elevating said housing, and means for horizontally swinging said housing, a bar attached to one of said connecting members and extending transversely thereof, a control member attached to said bar for horizontally moving said support frame in one direction and spring means attached to said bar and to the prime mover yieldingly urging said frame in an opposite direction.

6. In combination with a prime mover having a vertically disposed power take-off drive shaft, a power saw assembly comprising a vertically disposed housing, a driven shaft having a saw attached thereto disposed in said housing, a U-shaped support frame having the legs thereof mounted on the prime mover for horizontal swinging movement about the axis of rotation of said drive shaft, vertically spaced connecting members terminally pivoted to said housing and to the web portion of said U-shaped support frame for vertical swinging movement, means drivingly connecting said drive and driven shafts, actuating means carried by said support frame and operatively attached to one of said connecting members for vertically swinging said members and elevating said housing, and means for horizontally swinging said housing, a bar attached to one of said connecting members and extending transversely thereof, a control member attached to said bar for horizontally moving said support frame in one direction and spring means attached to said bar and to the prime mover yieldingly urging said frame in an opposite direction, and means attached to said bar and to said prime mover limiting horizontal swinging movement of said frame.

FORBY W. LAWRENCE.

REFERENCES CITED

The following references are of record in the file of this patent:

UNITED STATES PATENTS

| Number | Name | Date |
|--------|------|------|
| 638,553 | Burke | Dec. 5, 1899 |
| 934,363 | Rustad | Sept. 14, 1909 |
| 1,039,338 | Wallace | Sept. 24, 1912 |
| 1,830,871 | Domagala | Nov. 10, 1931 |
| 2,216,971 | Farmer | Oct. 8, 1940 |
| 2,441,431 | McDonald | May 11, 1948 |
| 2,457,511 | Ware | Dec. 28, 1948 |
| 2,462,314 | Fuqua | Feb. 22, 1949 |
| 2,463,232 | Zimicki | Mar. 1, 1949 |
| 2,509,092 | Faulkner | May 23, 1950 |